(12) United States Patent
Jansen et al.

(10) Patent No.: US 7,312,947 B2
(45) Date of Patent: Dec. 25, 2007

(54) MAGNETIC TAPE CARTRIDGE STORAGE APPARATUS WITH LOCK AND RELEASE DEVICE

(75) Inventors: Ørnulf Jansen, Harestua (NO); Ladislav Rubas, Tranby (NO); Jan Egil Baever, Oslo (NO)

(73) Assignee: Tandberg Data ASA, Oslo (NO)

( * ) Notice: Subject to any disclaimer, the term of this patent is extended or adjusted under 35 U.S.C. 154(b) by 418 days.

(21) Appl. No.: 10/909,054

(22) Filed: Jul. 30, 2004

(65) Prior Publication Data
US 2006/0023346 A1 Feb. 2, 2006

(51) Int. Cl.
*G11B 15/68* (2006.01)

(52) U.S. Cl. ...................... 360/92; 369/30.42
(58) Field of Classification Search ............. 360/92; 369/30.42
See application file for complete search history.

(56) References Cited

U.S. PATENT DOCUMENTS

| | | | |
|---|---|---|---|
| 4,802,035 A | 1/1989 | Ohtsuka | |
| 4,812,629 A | 3/1989 | O'Neil et al. | |
| 4,910,619 A | 3/1990 | Suzuki et al. | |
| 5,157,565 A * | 10/1992 | Domel | 360/92 |
| 5,285,335 A | 2/1994 | Sato | |
| 5,303,214 A | 4/1994 | Kulakowski et al. | |
| 5,508,859 A | 4/1996 | Hu et al. | |
| 5,781,368 A | 7/1998 | Kotaki et al. | |
| 6,042,205 A * | 3/2000 | Coffin et al. | 312/332.1 |
| 6,134,212 A | 10/2000 | Pines et al. | |
| 6,271,982 B1 | 8/2001 | Helmick | |
| 2003/0086202 A1 | 5/2003 | Hoelsaeter | |

* cited by examiner

*Primary Examiner*—A. J. Heinz
(74) *Attorney, Agent, or Firm*—Schiff Hardin LLP

(57) ABSTRACT

A storage magazine for data cartridges includes a plurality of storage slots located side-by-side and potentially above one another. The storage slots are defined by parting walls disposed at spaced intervals between top and bottom surfaces of the storage magazine. The parting walls include a stop rib at the back end and a latch mechanism integrated into the wall of the parting wall. The latch mechanism includes a pivot member extending across an opening in the parting wall and first and second arms extending in substantially opposite directions from one another. On of the arms is a latch arm to engage a recess in a side wall of the data cartridges and the other of the arms is a release arm for pivoting movement to move the latch arm from the recess in the data cartridge. A foot extends perpendicularly from the major planer surfaces of the parting wall providing a mounting base for stabilizing the parting wall between the top and bottom plates and supporting the cartridge in the correct position for engagement.

12 Claims, 11 Drawing Sheets

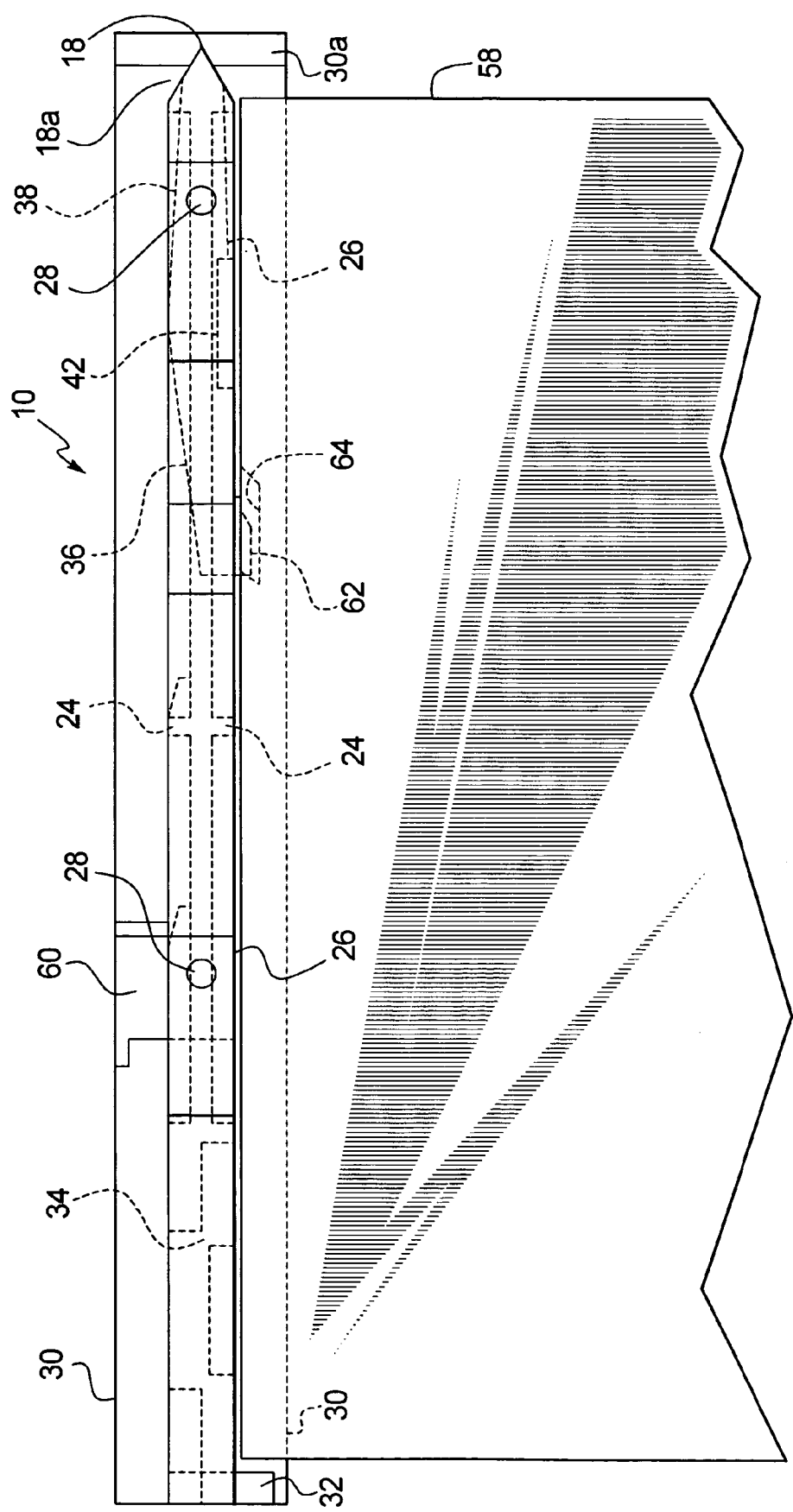

MAGNETIC TAPE CARTRIDGE STORAGE APPARATUS WITH LOCK AND RELEASE DEVICE

BACKGROUND OF THE INVENTION

1. Field of the Invention

The present invention relates generally to an apparatus in which to store magnetic tape cartridges, for example, and in particular to a cartridge storage magazine having a device for securing a data cartridge in a storage slot of the magazine and for selectively releasing the data cartridge from the storage slot.

2. Description of the Related Art

Magnetic tape cartridges and other recordable media cartridges are provided in standard form factors for use by recording and playback devices. The data cassettes must be stored between uses and so various storage systems have been developed in which the cartridges may be stored.

Automated data recording and playback devices have been developed, such as for data back up in a computer system, which not only automatically record data onto magnetic data cartridges but which also automatically transport the data cartridges between the recording and playback apparatus and storage locations. In one example of an automated recording and playback apparatus, a cartridge shuttle moves the data cartridges one at a time between data cartridge storage magazines and the recording and playback apparatus. The cartridge storage magazines must hold the data cartridges in predetermined positions so that they may be accessed by the robotic cartridge shuttle. As such, the cartridge must be secured in a fixed and known position in the storage magazine and be readily released from the fixed position for access by the cartridge shuttle.

SUMMARY OF THE INVENTION

The present invention provides a data cartridge storage magazine which selectively secures and releases the data cartridges in predetermined positions in storage slots in the magazine. In particular, the present invention provides a storage magazine having a plurality of storage slots for cartridges, the storage slots being separated from one another by parting walls. Each of the parting walls of the cartridge storage magazine incorporates therein a catch mechanism by which the data cartridge is secured in the predetermined position in the storage slot of the storage magazine. The catch mechanism, according to embodiments of the present invention, is a pivotable locking arm in the parting wall and has a locking hook which engages into a recess in the data cartridge. The locking hook is selectively disengagable from the cartridge recess by pivoting movement of a release arm portion of the latch mechanism. An spring may optionally be provided to bias the catch mechanism.

BRIEF DESCRIPTION OF THE DRAWINGS

FIG. 4 is a top plan view of the first embodiment of the parting wall as shown in FIG. 1 with the data cartridge indicated in phantom adjacent thereto;

DETAILED DESCRIPTION OF THE PREFERRED EMBODIMENTS

In the preferred embodiments of the present invention, a storage magazine for storing data cartridges in an automated data recording and playback apparatus is provided. The principles of the present invention are applicable to a storage magazine for storing a wide variety of cartridges, including magnetic data cartridges, optical data cartridges, music tape or disk cartridges, video cartridges, optical media cartridges, magnetic media cartridges, magneto-optical cartridges, etc. The cartridges can be of various sizes and formats, including ¼ inch QIC format, 4 mm tape cartridges, 8 mm tape cartridges, CompacTape cartridges, DLT cartridges, 3480, 3490, 3590 or 9840 cartridges, TR-1 and TR-3 cartridges, etc. Other cartridge types and sizes are included as well.

With the present invention, an inexpensive and a space saving storage magazine for the data cartridges is provided with a catch and release arm for selective engagement and release of the cartridge in a simple manner. In particular, pivoting rotation of the catch and release arm enables the catch to engage the cartridge and hold it in place and pivoting rotation of the arm in the other direction disengages the catch or latch from the cartridge to release so as to permit removal of the cartridge from the storage slot. The pivoting motion of the catch and release arm is biased, such as by a spring, toward the engaged or latched position, thereby preventing inadvertent release of the catch.

The present storage magazine has its storage slots separated from one another by parting walls that have a built-in latch. The parting walls of the present invention are inexpensive to manufacture, such as being formed of a molded plastic material. In one embodiment the latch is molded in one piece with the parting wall and utilizes a metal reinforcing torsion spring secured to the parting wall to provide reliable performance and strength for the latch arm. In this embodiment, the parting wall and latch are molded in a single piece so that all relative dimensions and positions of key features are positively determined for an inexpensive yet effective manufacture. Another, preferred, embodiment of the parting wall includes a catch and release arm that are formed separately from the parting wall and are subsequently connected together by a pivot pin. A leaf spring is provided to bias the catch and release arm toward the engaged position.

In yet a further advantage, a cartridge stop projection and a parting wall foot are provided molded into the parting wall. The cartridge in the storage slot rests on the parting wall foot and contacts the stop projection to ensure proper positioning of the data cartridge in relation to the catch element to guarantee engagement by the catch element.

Figure 1:
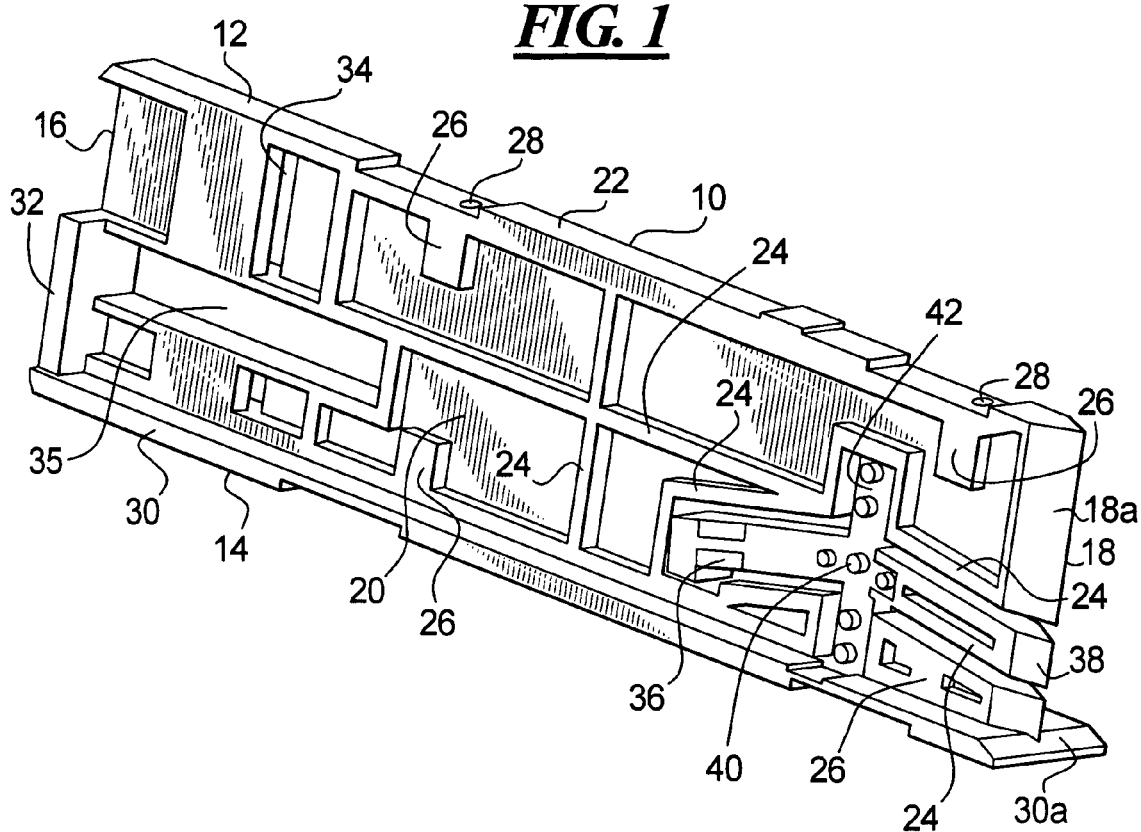
FIG. 1 is a side perspective view of a first embodiment of a parting wall for a data cartridge storage magazine according to the principles of the present invention.

With reference to the drawings, FIG. 1 shows the first embodiment of a parting wall 10 formed of molded plastic material. The parting wall 10 includes a top edge 12, bottom edge 14, back edge 16 and front edge 18. The parting wall 10 also includes a left side surface 20 as a first major surface of the parting wall and a right side surface 22 (hidden from view in the view of FIG. 1). The left side surface 20 includes reinforcing ribs 24. Reinforcing ribs are also provided on the right side surface 22. Also visible on the side wall 20 are thickened portions 26 into which extends threaded bores 28 for screws to secure a plurality of the parting walls 10 to top, bottom, and back plates of the storage magazine. The threaded bores 28 are provided at spaced locations along the top surface 12 and the bottom surface 14. The back plate of the storage magazine may be formed as part of either the top or bottom plate, or both.

The bottom edge 14 of the parting wall is provided with a foot 30 extending perpendicular to the main surfaces of the parting walls along the length of the bottom edge. The foot 30 extends from both the left and right sides 20 and 22 of the parting wall 10. The foot 30 provides stability in the wall orientation when mounted between the top and bottom plates that form the storage magazine. More importantly, the foot 30 provides the correct positioning of the data cartridge in the slot so that the catch element is engaged into the cartridge opening. When a data cartridge is positioned in a storage position within the storage slot of a storage magazine, the lower outer edges of the data cartridge rest on the top surface of the foot 30 of each adjacent wall 10. This places the cartridge at just the right height for engagement of the catch element.

At the rear edge 16 of the parting walls 10 is provided a cartridge stop rib 32 which extends transverse to the main surface of the parting walls and into the storage slot so that a data cartridge inserted into the storage slot abuts against the cartridge stop rib 32. The cartridge stop rib thereby defines the fully inserted position of the data cartridge in the storage slot precisely to permit the latch mechanism to engage correctly, as will be discussed hereinafter.

Figure 5:
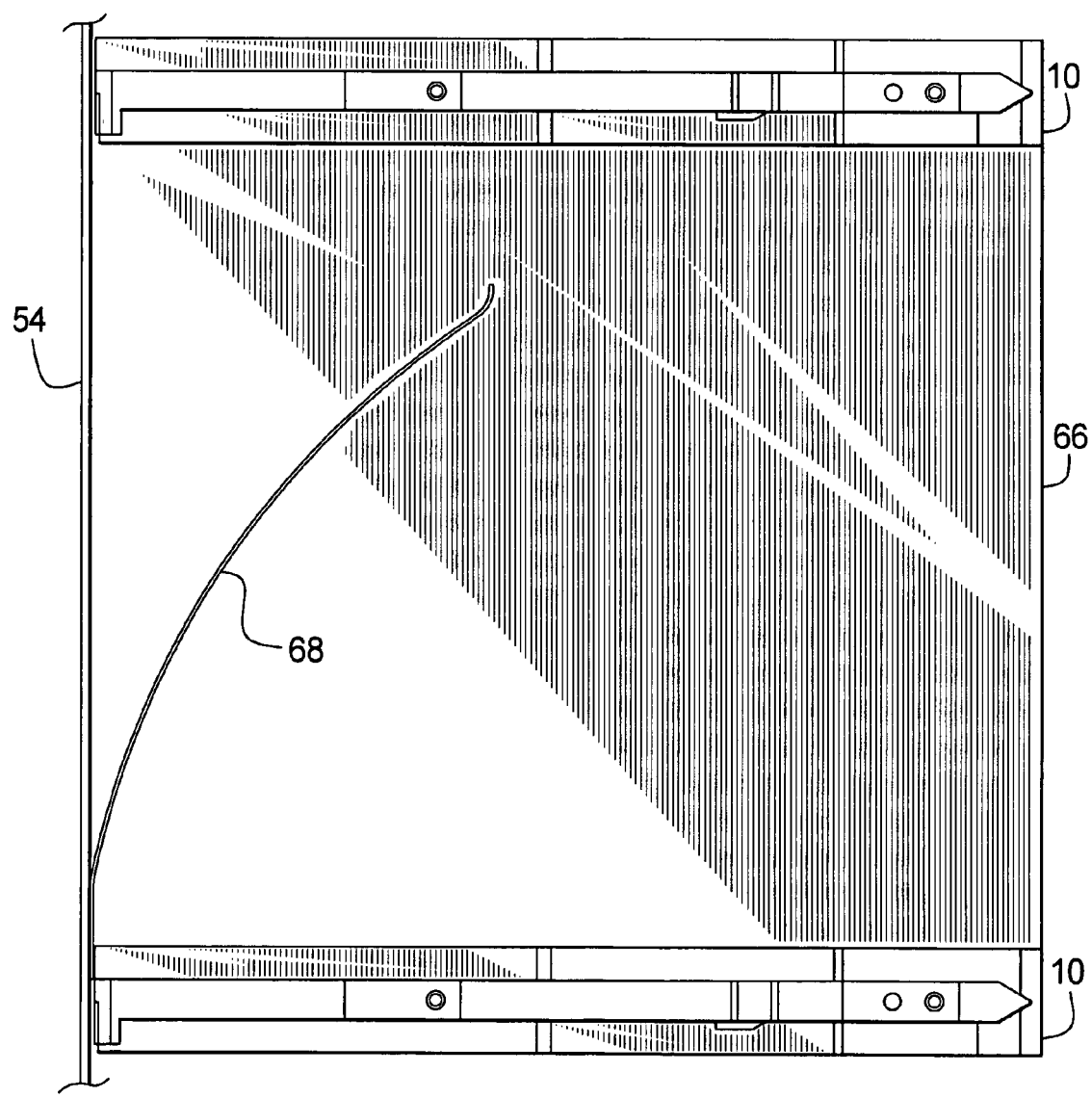
FIG. 5 is a top plan view of two parting walls of the first embodiment disposed at a spaced interval to define a storage slot for a data cartridge and showing a cartridge release spring in the storage slot.

Also at the back end of the parting walls 10 is provided a fastening slot 34 into which an end of a cartridge release spring is engaged, as well be discussed in conjunction with FIG. 5.

The front edge 18 of the parting walls 10 is shaped with bevels 18A on both sides thereof to guide in data cartridges being inserted into the storage slots, for example, by an automated cartridge handling apparatus. The front edge of the foot 30 is also beveled at surface 30A for the same reason.

A cartridge latching mechanism in accordance with the principles of the present invention is incorporated into the parting walls 10. In particular, openings are provided in the parting walls in which are disposed arms 36 and 38. The arm 38 lies in the plane of the parting walls 10, while the arm 36 extends at an angle from the parting walls 10 into the storage slot for the data cartridge. In particular, the arm 36 extends out of the plane of the parting walls 10. The arms are disposed in corresponding openings in the parting walls 10 and the openings are bounded by the reinforcing ribs 24. The arms 36 and 38 are themselves reinforced by reinforcing ribs 24 for added strength.

The arms 36 and 38 pivot together relative to the parting walls 10 due to their common connection to a central pivot portion 40. The central pivot portion 40 includes a vertically extending connection between the adjoining ends of the arms 36 and 38 and the parting walls 10. The central pivot portion 40 is in the shape of a cross bar extending transverse to the direction of the arms 36 and 38. The central pivot portion 40 is of molded plastic formed unitarily with the parting walls 10. Two webs of the plastic material connects the common ends of the arms 36 and 38 to the parting wall 10. Since the plastic webs of the pivot 40 are subjected to a twisting force during pivoting of the arms 36 and 38, a reinforcing piece is mounted on the central pivot portion according to first embodiment. The reinforcing piece 42 of the preferred embodiment is a metal strip of spring material having vertically extending arms extending above and below the central pivot portion 40 of the arms 36 and 38 and horizontal arm portions extending along at least a portion of the length of the arms 36 and 38. The vertical portions of the reinforcing piece lie along the webs of plastic at the pivot portions to prevent weakening and breakage.

Although various means are available for incorporating the reinforcing metal spring 42 at the central pivot portion 40, the illustrated embodiment includes a plurality of bores at spaced locations along the metal spring 42 and corresponding posts of plastic material extending through the bores which are subsequently deformed to form plastic rivets or welds to secure the metal spring 42 to the central pivot portion 40. The metal spring(s) 42 may be mounted at one or both sides of the parting wall 10. Of course, other configurations of the reinforcing members 42 may be provided.

Figure 1A:
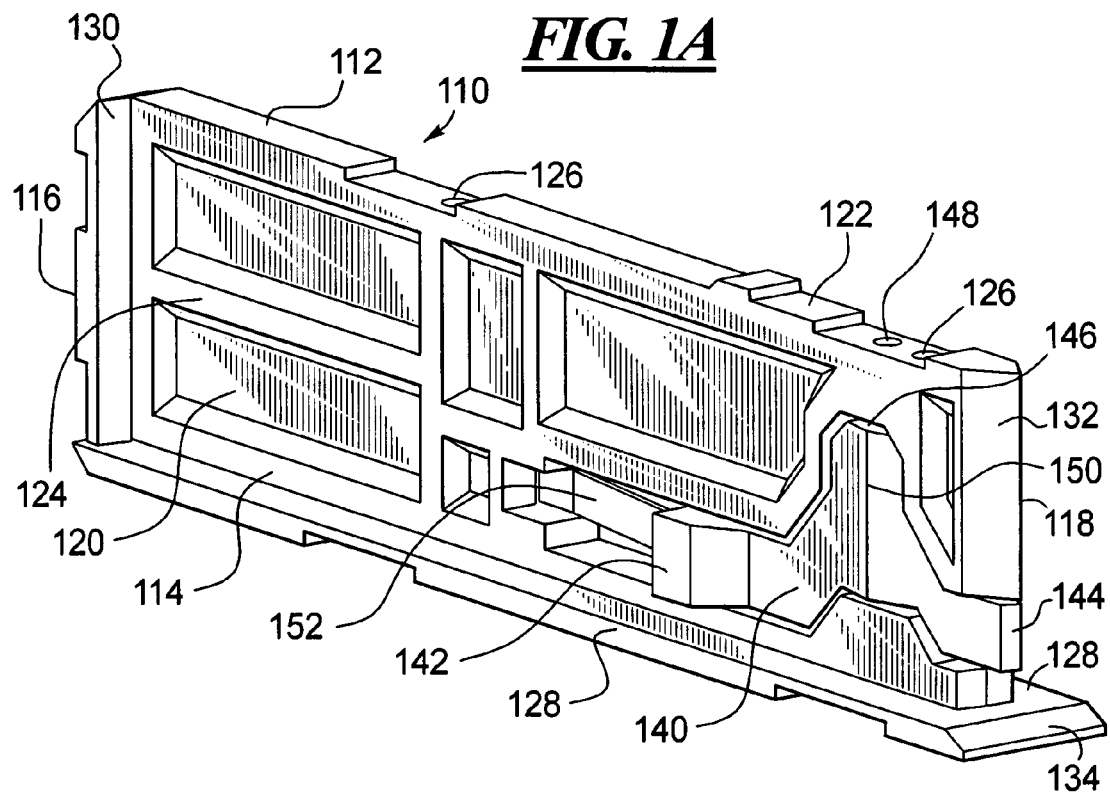
FIG. 1A is a side perspective view of a second embodiment of a parting wall for a data cartridge storage magazine.

A second embodiment of the parting wall is shown in FIG. 1A. The second embodiment is similar to the first embodiment in many respects, differing primarily in the structure of the catch mechanism although a few other differences exist as well. In detail, the parting wall 110 has a top surface 112, a bottom surface 114, a back end 116, and a front end 118. A side surface 120 and opposite side surface 122 has reinforcing ribs 124. Threaded bores 126 are provided at the reinforcing ribs 124 of the second embodiment, so that there is no requirement of a separate thickened portion in which to provide the bores. The second embodiment has the foot 128 at the bottom edge 114 and a rear stop 130 at the end 116. The rear stop 130 extends the entire vertical height of the parting wall 110 in this embodiment. The front edge 118 has bevels 132 and the front of the foot 128 also has a bevel 134.

The catch mechanism of the second embodiment has a catch arm 140 with a catch element 142 at one end and a release element 144 at the opposite end. The catch arm 140 pivots about a pivot pin 146 that extends at least part way through the parting wall 110 at a pin opening 148 and through the catch arm 140. The pivot pin 148 may extend to the bottom edge 114 of the parting wall 110, or may end in the parting wall 110 below the pivot arm 110, particularly if the opening in which the pivot pin 148 is a blind hole.

The catch arm 140 itself is shaped with a central pivot portion 150 that extends vertically, through which the pivot pin 148 extends. The catch element 142 and release element 144 each extend in radially opposite directions from the central pivot portion 150 and, in the illustrated embodiment, are angled downwardly from the pivot potion 150. The catch element 142 is biased toward an engaged position by a spring 152. The spring 152 is a metal leaf spring, although other types of springs are of course possible for biasing the pivot motion of the catch arm 140. The spring 152 pushes the catch element 142 to a position to engage into an opening in the side of a data cartridge. To release the cartridge from the engaged position, the release element 144 is moved against the direction of the spring force so that the catch element 142 is moved out of the opening in the data cartridge.

Figure 1B:
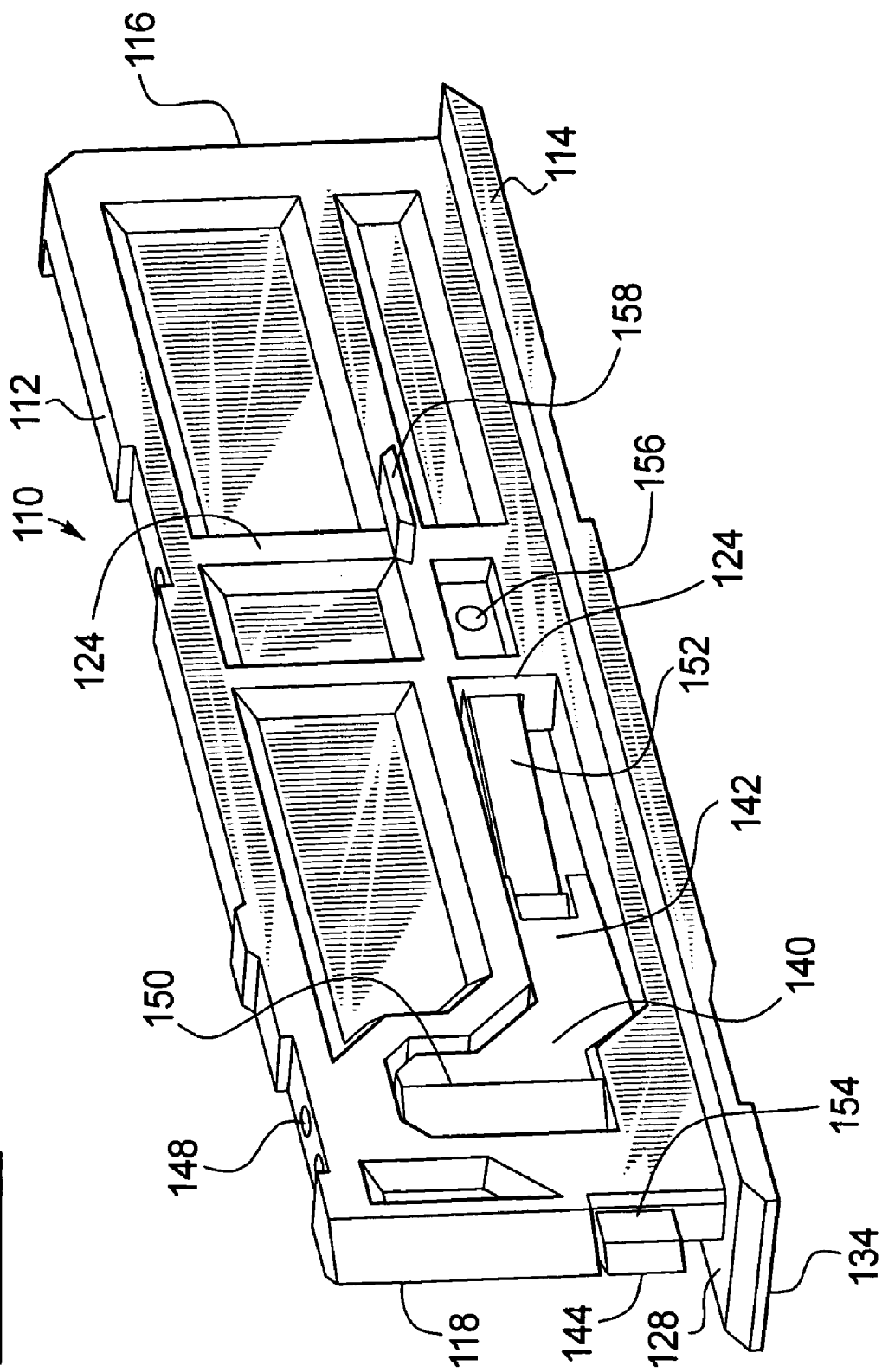
FIG. 1B is a side perspective view of the second embodiment of the parting wall of FIG. 1A, from the opposite side.

FIG. 1B shows the parting wall 110 from the opposite side. The parting wall has a similar arrangement of the ribs 124 as on the other side as shown in FIG. 1A. The foot 128 is provided along the bottom edge 114 on which the data cartridge is supported when in the storage slot. Thus, the data cartridge is supported on both bottom edges on the foot portions 128 of the two adjoining parting walls 110 to ensure the proper position of the data cartridge in the storage slot for engagement by the catch element 142. The side shown in FIG. 1B does not have the stop wall 130 that is provided on the opposite side, since it is not needed on this side to position the data cartridge for engagement.

Also in FIG. 1B, the catch arm 140 has the release element 144 pressed by the spring 152 against a stop 154 that is formed as a continuation of the parting wall 110. The stop ensures the proper engaged position of the catch element 142 and prevents the pivoting movement of the catch arm 140 beyond that position. The spring 152 presses against the back of the catch arm 140. The spring 152 is mounted in a spring mounting location 156. In the illustrated embodiment, the leaf spring 152 has a hole through which is positioned a projection of the plastic material of the parting wall 110. The projection is welded over the hole to secure the spring 152. One of the ribs 124 overlies the spring 152 for support.

The side shown in FIG. 1B may have a projection 158 that extends into the storage slot space to prevent inadvertent insertion of a data cartridge with a wrong orientation. This projection is optional, and may be omitted if desired.

Figure 2:
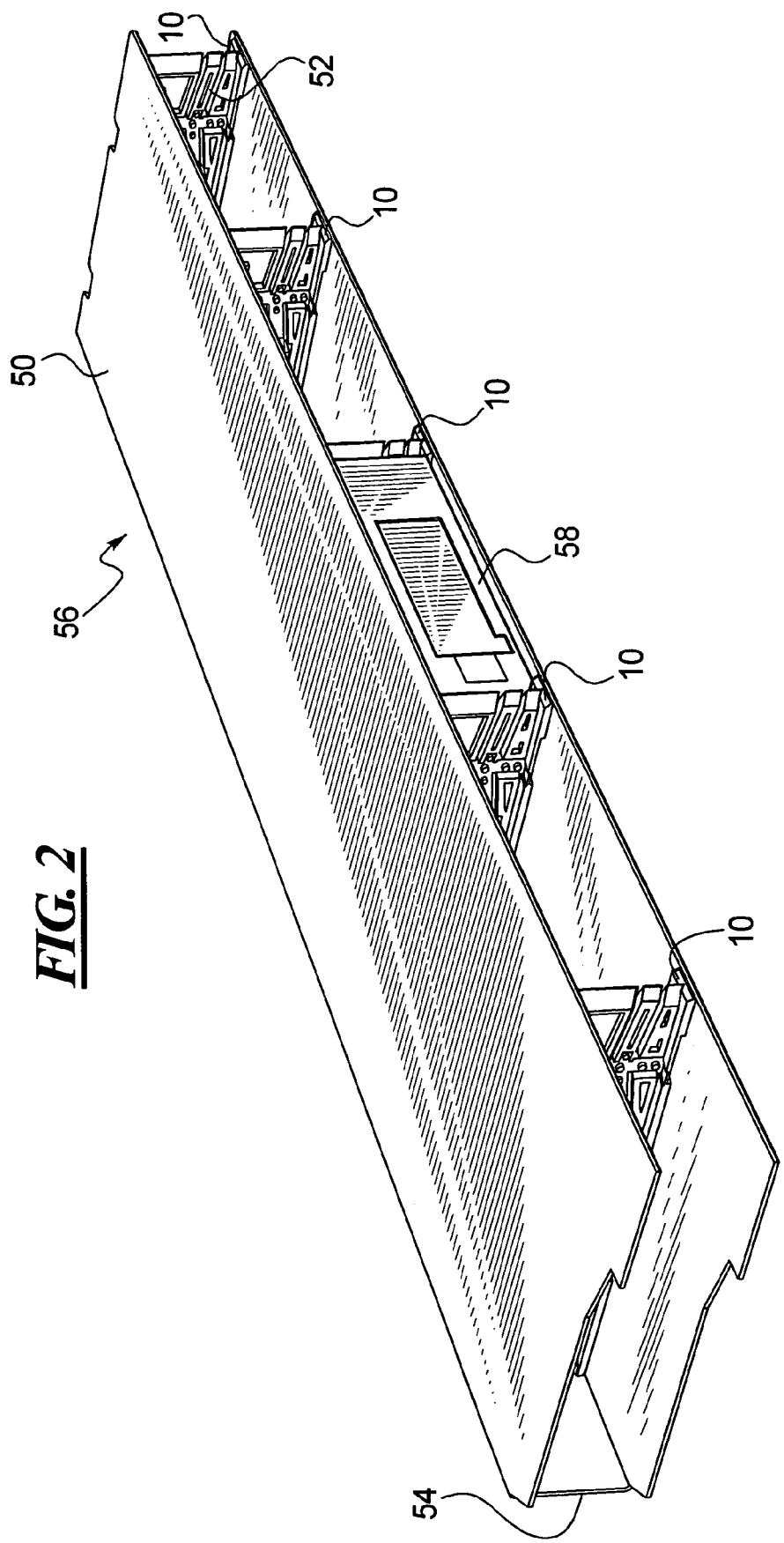
FIG. 2 is a front perspective view of a storage magazine for data cartridges utilizing the first embodiment of the parting walls as shown in FIG. 1 and including a data cartridge in a storage slot in a storage magazine.

In FIG. 2, a plurality of the parting walls of FIG. 1 are provided between two magazine housing plates 50 and 52 and with a rear plate 54 to form a cartridge storage magazine 56. The parting walls 10 are arranged in parallel to one another spaced by the width of a data cartridge 58 to form storage slots. The cartridge storage magazine 56 of FIG. 2 is capable of storing four data cartridges, such as the data cartridge 58 shown in one of the storage slots, in side-by-side relation. The cartridge storage magazine 56 may be stacked with other like storage magazines to form a multi-layer storage magazine so that the data cartridges may be stacked one over the other in addition to being arranged side-by-side while in the storage magazine 56.

Of course, it is also possible to provide other configurations of the storage magazine including greater numbers of storage slots in side-by-side relation or fewer numbers of storage slots, stacked rows of storage slots, or other arrangements.

By incorporating the cartridge latches into the parting walls 10, the cartridge storage magazine 56 is of a simple construction with a sheet metal top and bottom and rear plates 50, 52 and 54. Manufacturing costs of the cartridge storage magazine are thereby reduced and construction and assembling costs are decreased as well. No separate latching mechanisms need to be provided or constructed to ensure latching of the data cartridge 58 in the corresponding data cartridge slot.

The parting walls 10 with the built-in latch need not be provided at the endmost parting wall location of the magazine 56. In particular, the parting wall 10 of the illustrated embodiment interacts with cartridges to the left of the wall 10. For the left end most wall of the magazine, no cartridge will be positioned to its left, so the latch can be foregone and a plain parting wall provided instead. Of course, it is also possible that the left most wall includes the latch, which reduces the number of different parts that are required to assemble the magazine.

The present parting wall is shown connecting to a cartridge to it's left. Provided that cartridges are used with have engagement openings to their left, it will be possible to provide the latching mechanism of the present invention to latch to the right. Of course, either orientation of the latch is within the scope of this invention.

By assembling the top, bottom and rear plates 50, 52 and 54 with a number of the parting walls 10, the storage magazine 56 is formed. The spacing of the parting walls 10 from one another defines the width of the slot of accepting the data cartridge 58. The spacing corresponds to the form factor of the data cartridge 58. In particular, the first lateral edge of the data cartridge abuts against the side of one of the parting walls 10, assuring that it is pressed against the other side wall 10 so that the arm 36 of the latching mechanism may engage the corresponding opening in the data cartridge 58.

Figure 2A:
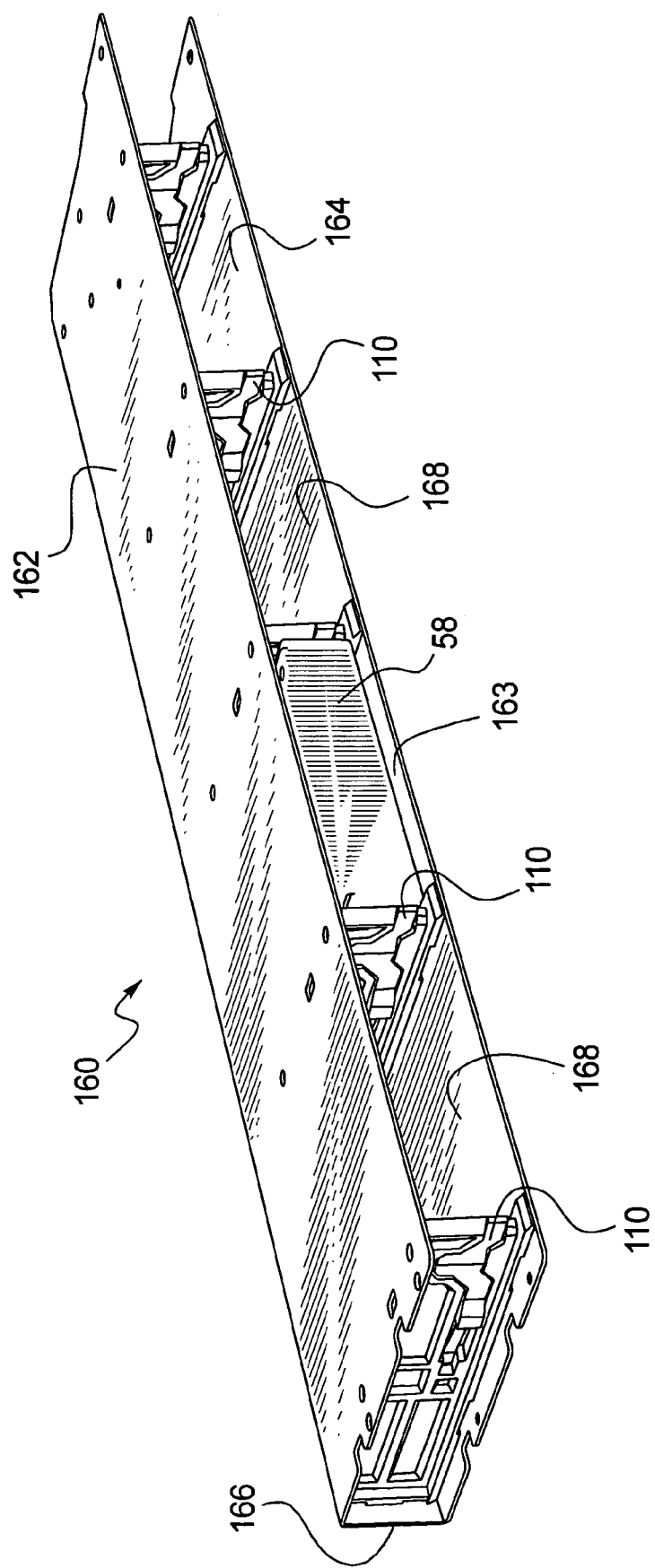
FIG. 2A is a front perspective view of a storage magazine for data cartridges utilizing the second embodiment of the parting wall of FIG. 1A and including a data cartridge in a storage slot in the storage magazine.

FIG. 2A illustrates the assembled magazine 160 with the parting walls 110 mounted between a top plate 162 and a bottom plate 164. A back wall 166 is also provided. The parting walls 110 are mounted at spaced intervals between the top and bottom plates 162 and 164 so as to define the storage slots 168 for the cartridges 58. One such data cartridge 58 is shown in a storage slot 168.

The storage magazine 160 is in one embodiment a shelf unit that is mounted together with other such self units to provide stacked shelves in a magazine assembly. Preferred examples of such magazine assemblies are either three or four shelves high, although other arrangements may also be provided The shape of the storage magazine 160 differs slightly from the storage magazine 56 of FIG. 2. The shape variation has to do with whether the magazine will be mounted to the left or to the right side within the autoloader apparatus.

Figure 3:
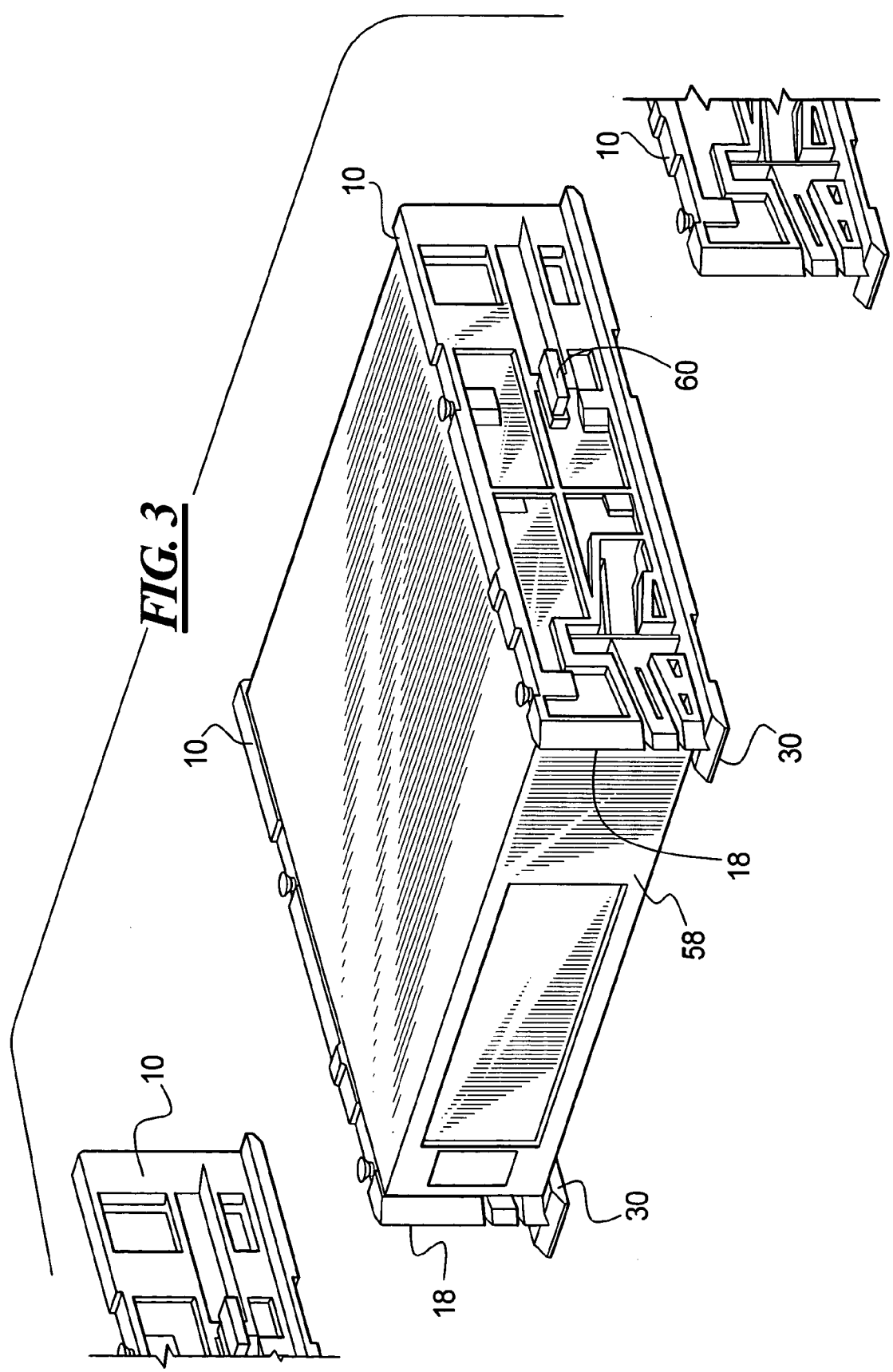
FIG. 3 is an enlarged fragmentary perspective view of a data cartridge disposed between two of the parting walls of the first embodiment, the parting walls shown positioned as if fixed in a storage magazine to define in a storage slot of a storage magazine and showing portions of further parting walls at spaced storage slot intervals therefrom.

In FIG. 3, the data cartridge 58 is shown between two of the parting walls 10 without the surrounding plates 50, 52 and 54 of the storage magazine. As can be seen by reference to FIG. 3, the side walls 10 are of a length slightly longer than the length of the data cartridge 58, thereby ensuring that the stop rib 32, as shown in FIG. 1, contacts the rear of the data cartridge 58 and stops the data cartridge 58 in the storage slot with the data cartridge recessed slightly behind the front edges 18 of the parting walls 10.

It may also be seen in FIG. 3 that the lateral lower edges of the data cartridge 58 rest on the foot 30 of the adjoining parting walls 10. The lateral sides of the data cartridge 58 are pressed against the side walls 20 and 22 of the parting walls 10. By resting on the foot 30, the data cartridge 58 is raised above the bottom plate 52 to decrease friction during movement of the data cartridge 58 in and out of the storage slot and prevents the cartridge from catching inadvertently. The position of the cartridge 58 on the foot 30 locates the engagement element of the catch at the correct position to engage in an engagement opening in the data cartridge 58.

Figure 3A:
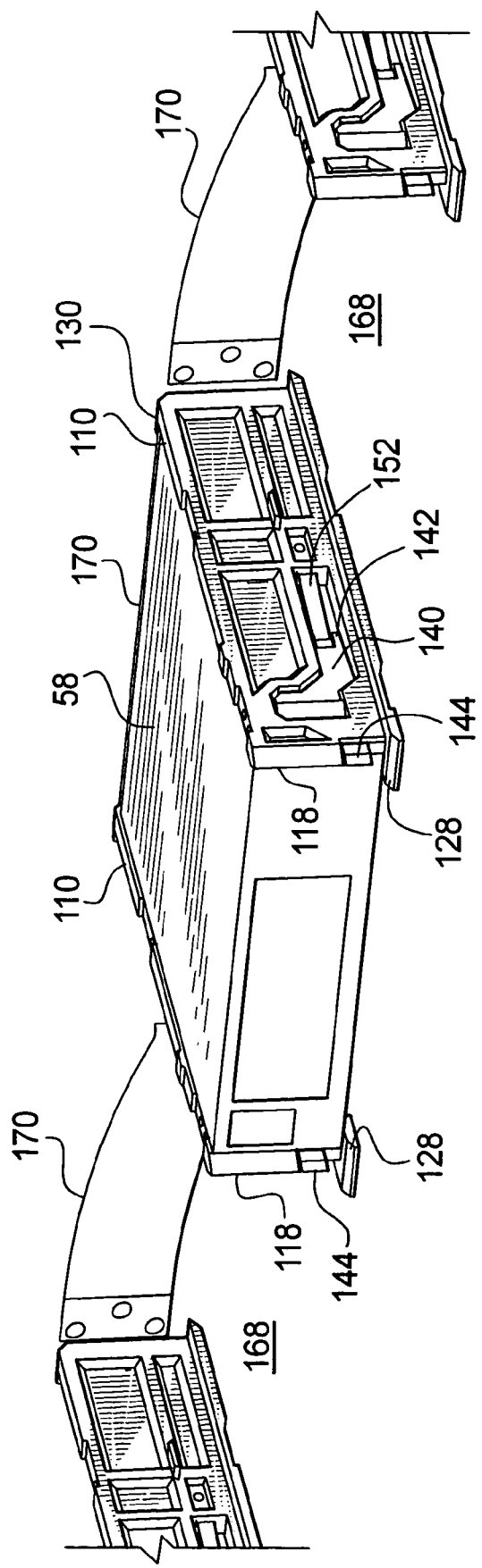
FIG. 3A is an enlarged fragmentary perspective view of a data cartridge disposed between two of the parting walls of the second embodiment, the parting walls shown positioned as if fixed in a storage magazine to define in a storage slot of a storage magazine and showing portions of further parting walls at spaced storage slot intervals therefrom and showing ejecting springs.

FIG. 3A provides a view similar to that of FIG. 3, but with the second embodiment of the parting walls 110. The data cartridge 58 fits between the parting walls 110 in the storage slot 168 defined therebetween. The cartridge 58 lower edges rest on the foot portions 128 of the parting walls 110 to position the cartridge 58 relative to the engagement element 142 of the catch. The front edges 118 of the parting walls 110 extend a short distance beyond the front of the cartridge 58 so that the release arm 144 may be contacted and moved to release the cartridge 58 from the engaged condition. Release of the engagement element 142 by pivoting movement of the catch 140 permits a release spring 170 to push the cartridge 58 out of the slot 168. The release springs 170 of neighboring slots 168 are shown in FIG. 3A in their relaxed position. The release spring 170 of the storage slot in which the cartridge 58 is being held is pressed to the flattened position with a resulting storing of spring energy. The release spring 170 pushes the cartridge 110 out of the slot 168 far enough that a robotic cartridge shuttle, also termed a cartridge picker, may engage the cartridge and transport it to a tape drive, for example.

With reference now to FIG. 4, the parting walls 10 include the stop rib 32. In the illustrated embodiment, the stop rib 32 extends from the wall 10 and ends just short of the foot 30. The stop rib 32 is only provided extending to one side of the parting wall 10 which is the same side as the latch 36 to ensure correct engagement of the latch 36 and prevent slight misalignments of adjacent parting walls 10 from preventing engagement. The spring receiving slot 34 is visible as three alternately located portions between which the end of the cartridge release spring is fitted. As can be seen in FIG. 1, below the slot 34 for accepting the mounting end of the spring is provided an elongated opening 35 in the parting walls 10. The threaded bores 28 are shown in FIG. 4, at the thickened portions 26. A horizontally oriented lateral extension 60, which is also seen in FIG. 3, extends from the parting walls 10 on the side opposite the stop rib 32 and at the same height as the opening 35 and at the same height as the opening 35. The reinforcing ribs 24 are also apparent in FIG. 4 on the side 22.

The arm 38 lies in the plane of the parting walls 10 and thereby provides the release arm for the latch mechanism. The arm 36 which serves as the latch is angled out from the plane of the parting walls 10 and has a thickened reinforced portion 62 at the end thereof which engages in a recess 64 in a side wall of the data cartridge 58. The thickened portion 62 resists wear as the side of the cartridge 58 rubs against it during invention and removal of the data cartridge 58. The reinforcing spring 42 for the pivotable latch may be seen in FIG. 4 embedded in the latch pivot arm.

In operation, a data cartridge 58 is inserted into the slot 66 defined by the adjacent parting walls 10, such as by an automated cartridge handling apparatus, or by hand. As the data cartridge 58 enters the slot, it deforms the latch arm 36 toward the plane of the parting walls 10. As the data cartridge 58 reaches the fully inserted position and contacts or nearly contacts the stop rib 32, the flexed latch arm 36 reaches the recess 64 in the side wall of the data cartridge 58 and moves to its non-flexed position into the recess 64. The reinforced end 62 of the latch arm 36 engages the side walls of the recess 64 to hold the data cartridge 58 in the slot in a secure and defined position.

To release the data cartridge 58 from the storage slot 66, pressure is exerted against the data cartridge 58 into the storage slot to ensure that the latch arm 36 is not engaging the side wall of the recess 64. The release arm 38 is then flexed in a direction toward the data cartridge 58, causing a pivoting or rotating movement of the latch mechanism and thus moving the latch arm 36 into the plane of the parting wall 10 and clear of the side wall of the data cartridge 58, permitting the data cartridge 58 to slide freely from the storage slot 66.

Figure 4A:
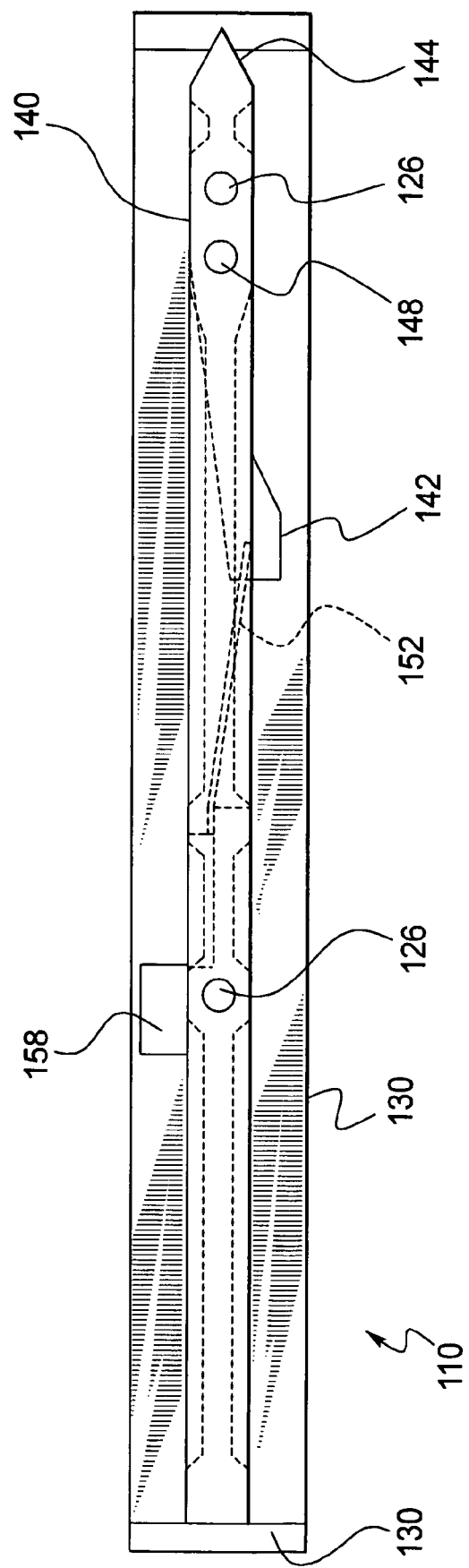
FIG. 4A is a top plan view of the second embodiment of the parting wall as shown in FIG. 1 with the data cartridge indicated in phantom adjacent thereto.

FIG. 4A has a similar view to FIG. 4, but shows instead the second embodiment of the parting wall 110. The parting wall 110 has the pivot pin 148 about which the catch 140 pivots. The movement of the catch 140 moves the engagement element 142 into and out of engagement with the data cartridge. The spring 152 that pushes against the catch 140 is shown as well.

In FIG. 5, a view of a storage slot 66 for accepting a data cartridge 58 is defined by two parting walls 10 and a rear wall 54. Along the rear wall 54 is a cartridge release spring 68 which is biased to push the data cartridge 58 from the slot 66 when the latch mechanism 36 has been released. The cartridge release spring 68 is a flat leaf spring formed with an arch so that it pushes outward on the data cartridge 58 but also so that it can be pressed flat against the rear wall 54 while the data cartridge 58 is fully inserted into the storage slot 66.

Figure 5A:
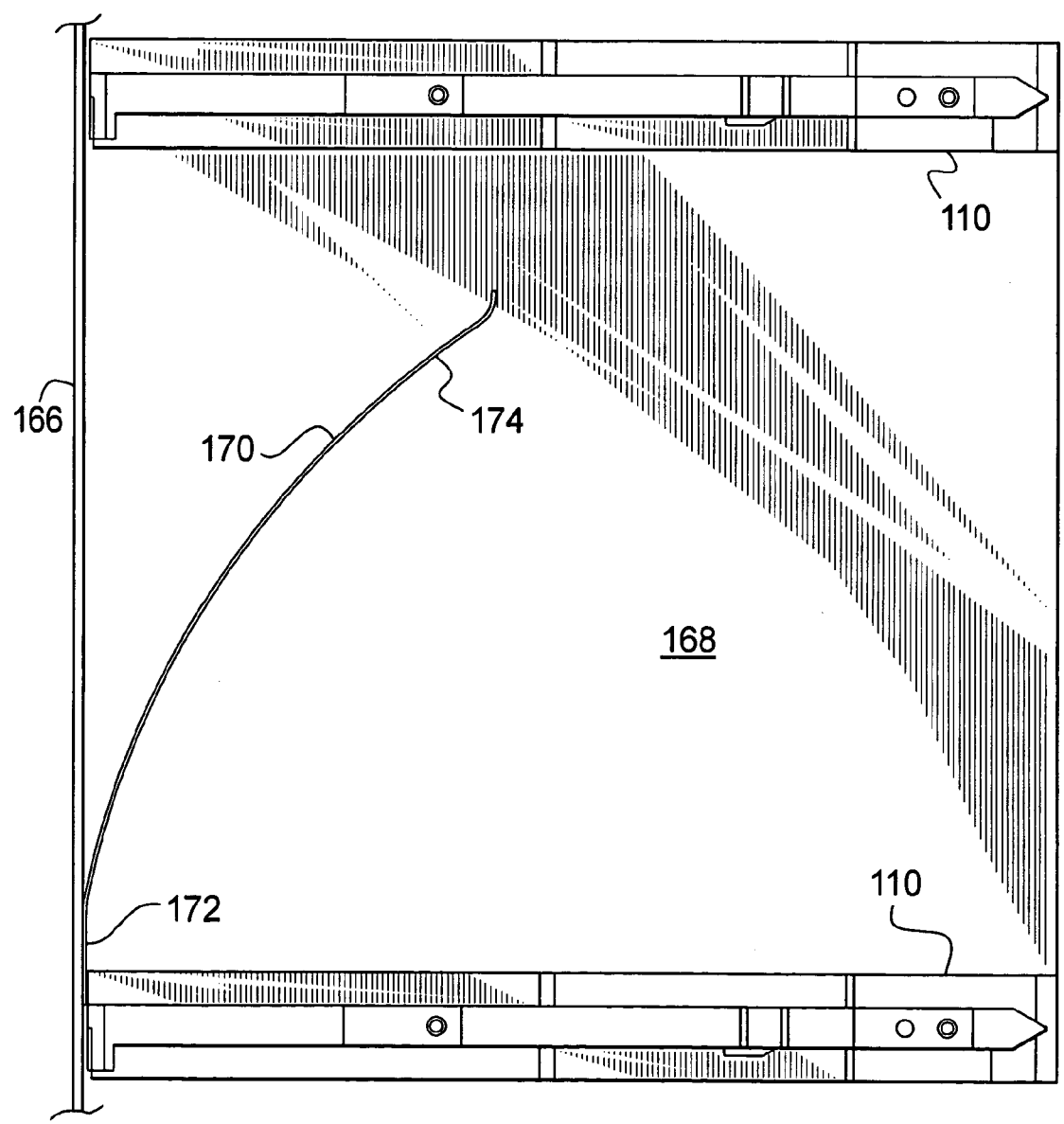
FIG. 5A is a top plan view of two parting walls of the second embodiment disposed at a spaced interval to define a storage slot for a data cartridge and showing a cartridge release spring in the storage slot.

FIG. 5A shows that the arrangement of the parting walls 110 and the release spring 170. The spring 170 is mounted at an end 172 on the rear wall 166 of the magazine. The free end 174 of the spring extends into the storage slot 168 to push the cartridges from the storage slot once the engagement element is released.

Figure 6:
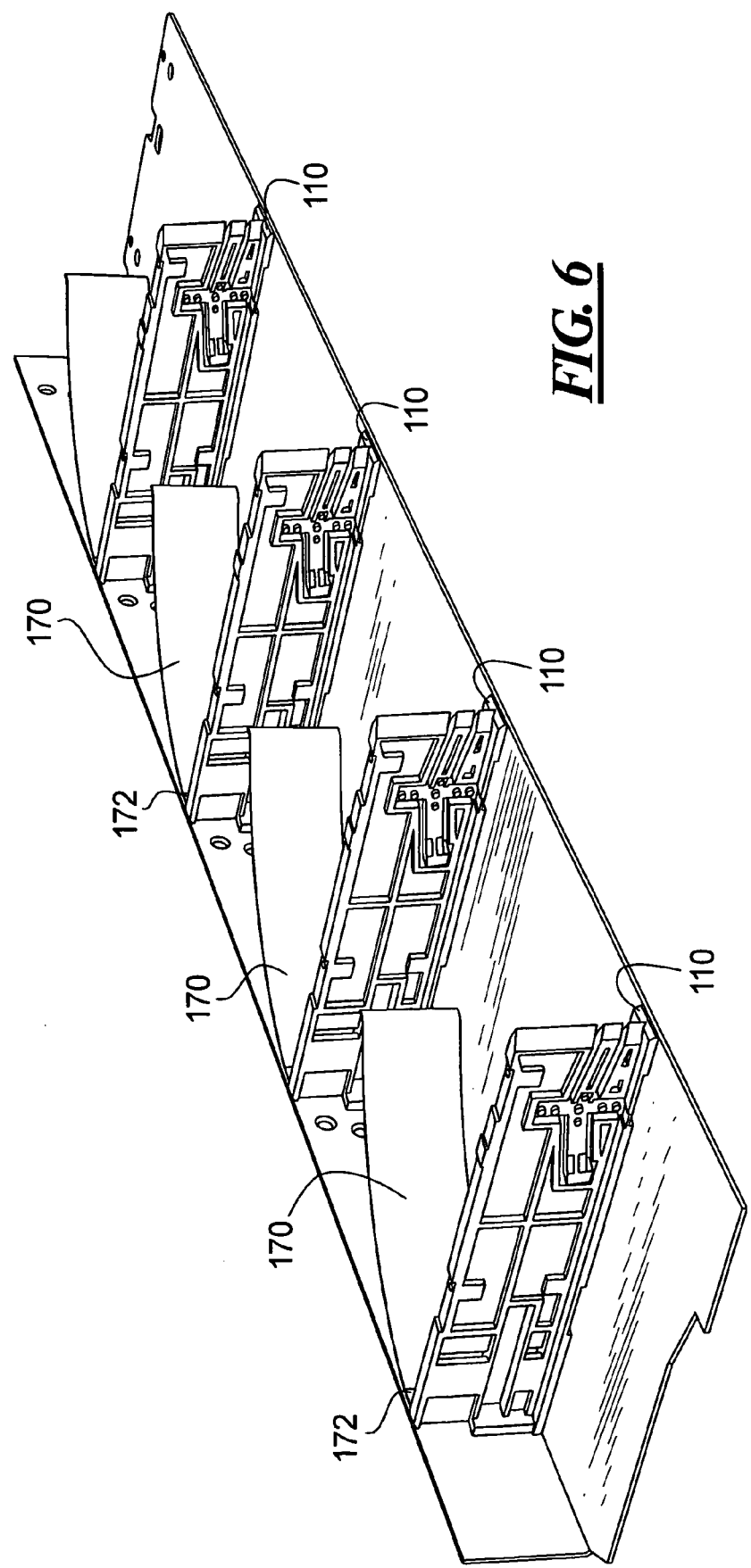
FIG. 6 is a top isometric view of the storage magazine showing the parting walls and the release springs connected in the magazine housing.

FIG. 6 is a view of the magazine with the top plate shown in phantom to reveal the release spring 170 and the parting walls 110. The release spring 170 has been connected to the back wall 166 of the magazine.

There has been shown and described a storage magazine for cartridges, such as data cartridges, which incorporates a latching mechanism into the dividing wall between the data cartridge storage slots. Manufacture of the present magazine is simplified since the top and bottom end plates of the storage magazine may be formed of sheet metal and only the dividing walls are formed with any complexity. Further, the present parting walls 10 are formed in one piece of molded plastic or elastomeric material with only the addition of a metal leaf spring 42 to reinforce the pivot point of the latch required to complete construction of the parting walls 10. The second embodiment requires only the addition of a pivot pin, leaf spring and catch part for even more durable operation.

In summary, when a cartridge is inserted between two of the parting walls, the locking hook 36 will deflect to the side and the cartridge continue loading until it is stopped by pressing against the cartridge stop rib 32. During the loading of the cartridge into the storage magazine, the cartridge release spring 68 will be compressed. Just before the cartridge hits the cartridge stop rib 32, the locking hook 36 of the latch mechanism will snap into the recess in the cartridge 58 and the cartridge will be locked in the storage magazine.

To release the cartridge 58 and unload the storage slot 66, the release arm 38 is activated by pressing to the side so that it pivots and thereby causes the locking arm 36 to come out of engagement with recess in the data cartridge 58. The cartridge release spring 68 presses on the cartridge to push the cartridge 58 out of the storage slot 66 in the magazine.

Although other modifications and changes may be suggested by those skilled in the art, it is the intention of the inventors to embody within the patent warranted hereon all changes and modifications as reasonably and properly come within the scope of their contribution to the art.

We claim:

1. A storage magazine for a data cartridge comprising:
    a magazine body including top, bottom, and back walls;
    a plurality of parting walls mounted between said top and bottom walls at spaced locations to define storage slots therebetween, said parting walls each including a resilient latch extending out of a plane of said parting walls and into contact with an engagement surface of a respective data cartridge to retain the data cartridge in a respective one of the storage slots;
    a cartridge release spring in each of said storage slots and disposed to urge the data cartridges from the storage slots when not restricted by said resilient latch.

2. A storage magazine for a data cartridge comprising:
    a magazine body including top, bottom, and back walls;
    a plurality of parting walls mounted between said top and bottom walls at spaced locations to define storage slots therebetween, said parting walls each including a resilient latch extending out of a plane of said parting walls and into contact with an engagement surface of a respective data cartridge to retain the data cartridge in a respective one of the storage slots, wherein said latch includes first and second arms extending in substantially opposite directions from a central pivot portion, said first and second arms being pivotable about said central pivot portion for selective disengagement from the data cartridge.

3. A storage magazine as claimed in claim 2, further comprising:
    a stop rib extending perpendicular from each of said parting walls for engagement with the data cartridge when the data cartridge is in said storage slot.

4. A storage magazine as claimed in claim 2, wherein said central pivot portion is molded unitarily with said parting walls.

5. A storage magazine as claimed in claim 2, wherein said central pivot portion and said first and second arms are unitarily molded with said parting wall.

6. A storage magazine as claimed in claim 2, further comprising:
    a reinforcing spring affixed to said central pivot portion and extending to said parting wall.

7. A storage magazine as claimed in claim 2, wherein said central pivot portion is formed separately from said separator walls, and further comprising:
    a pivot pin pivotally connecting said central pivot portion to said parting wall.

8. A storage magazine claimed in claim 7, further comprising: a bias spring connected to said parting wall and pressing against said latch.

9. A storage magazine for data cartridges, comprising:
    a magazine body defining an interior space;
    a substantially planar wall body as a parting wall in said interior space, said substantially planar wall body defining an opening therethrough;
    a pivot member extending across said opening;
    a latch arm extending in a first direction from said pivot member, said latch arm extending out from a plane of said substantially planar wall body when in a relaxed position for engagement with a surface of a data cartridge; and
    a release arm extending from said pivot member in a direction generally opposite said first direction of said latch arm, said release arm being selectively pivotable to cause said latch arm to be moved generally into the plane of said substantially planar wall body.

10. A storage magazine as claimed in claim 9, further comprising:
    a reinforcing spring affixed to said pivot member.

11. A storage magazine as claimed in claim 9, further comprising:
    a stop rib extending substantially perpendicularly from said substantial planar wall body adjacent one end thereof.

12. A storage magazine as claimed in claim 9, a foot along at least one longitudinal edge of said substantially planar wall body.

* * * * *